United States Patent
Li et al.

(10) Patent No.: US 7,817,558 B2
(45) Date of Patent: Oct. 19, 2010

(54) FLOW BASED FLOW CONTROL IN AN ETHERNET SWITCH BACKPLANE

(75) Inventors: Pui Li, Los Altos Hills, CA (US); Harsh Singh, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 492 days.

(21) Appl. No.: 11/557,928

(22) Filed: Nov. 8, 2006

(65) Prior Publication Data

US 2007/0268830 A1 Nov. 22, 2007

Related U.S. Application Data

(60) Provisional application No. 60/747,773, filed on May 19, 2006.

(51) Int. Cl.
*G08C 15/00* (2006.01)
(52) U.S. Cl. .................... 370/236; 370/235; 370/468
(58) Field of Classification Search .................. 370/229, 370/230, 230.1, 232, 235, 236, 237, 395.41, 370/395.42, 414, 418, 468
See application file for complete search history.

(56) References Cited

U.S. PATENT DOCUMENTS 5,442,624 A * 8/1995 Bonomi et al. .............. 370/231
5,463,620 A * 10/1995 Sriram ........................ 370/412
6,188,671 B1 * 2/2001 Chase et al. ................. 370/232
6,980,520 B1 * 12/2005 Erimli ......................... 370/236
7,061,868 B1 * 6/2006 Ahlfors et al. .............. 370/236
2004/0202169 A1 * 10/2004 Mukouyama et al. ..... 370/395.1
2007/0253415 A1 * 11/2007 Chase et al. ................. 370/389

OTHER PUBLICATIONS

IEEE 802.3-2005, CSMA/CD; Website Address: http://standards.ieee.org/getieee802/index.html.

* cited by examiner

*Primary Examiner*—Donald L Mills
(74) *Attorney, Agent, or Firm*—Stolowitz Ford Cowger LLP

(57) ABSTRACT

In one embodiment, a method includes detecting packet congestion in a network device that includes a switch, and a plurality of components operable to transmit and receive data packets from and to the switch. The method includes, in response to detecting packet congestion, transmitting an Ethernet pause frame to at least one of the plurality of components, the at least one component identified as a source of a data packet that caused the packet congestion, and transmitting a backward congestion notification (BCN) packet to the at least one component, the BCN packet including some data payload of the data packet that caused the packet congestion. The method includes regulating an offending packet stream originated from the at least one component relative to a non-offending packet stream originated from the at least one component to lower traffic load of the offending packet stream relative to the non-offending packet stream, where the data packet that caused the packet congestion belonging to the offending packet stream.

19 Claims, 6 Drawing Sheets

FLOW BASED FLOW CONTROL IN AN ETHERNET SWITCH BACKPLANE

CROSS REFERENCE TO RELATED APPLICATIONS

This application claims priority from U.S. provisional patent application Ser. No. 60/747,773, Method and Apparatus for Flow Based Control in an Ethernet Switch Backplane, which was filed on 19 May 2006. U.S. provisional application 60/747,773 is incorporated by reference in its entirety.

BACKGROUND

1. Technical Field

The present disclosure relates generally to flow control in packet network communication systems.

2. Description of the Related Art

Flow control is the management of data flow between computers or devices or between nodes in a network so that the data can be handled at an efficient pace. Too much data arriving before a device can handle may cause data overflow, meaning that the data is either lost or must be retransmitted.

DESCRIPTION OF EXAMPLE EMBODIMENTS

1. Overview

Figure 1:
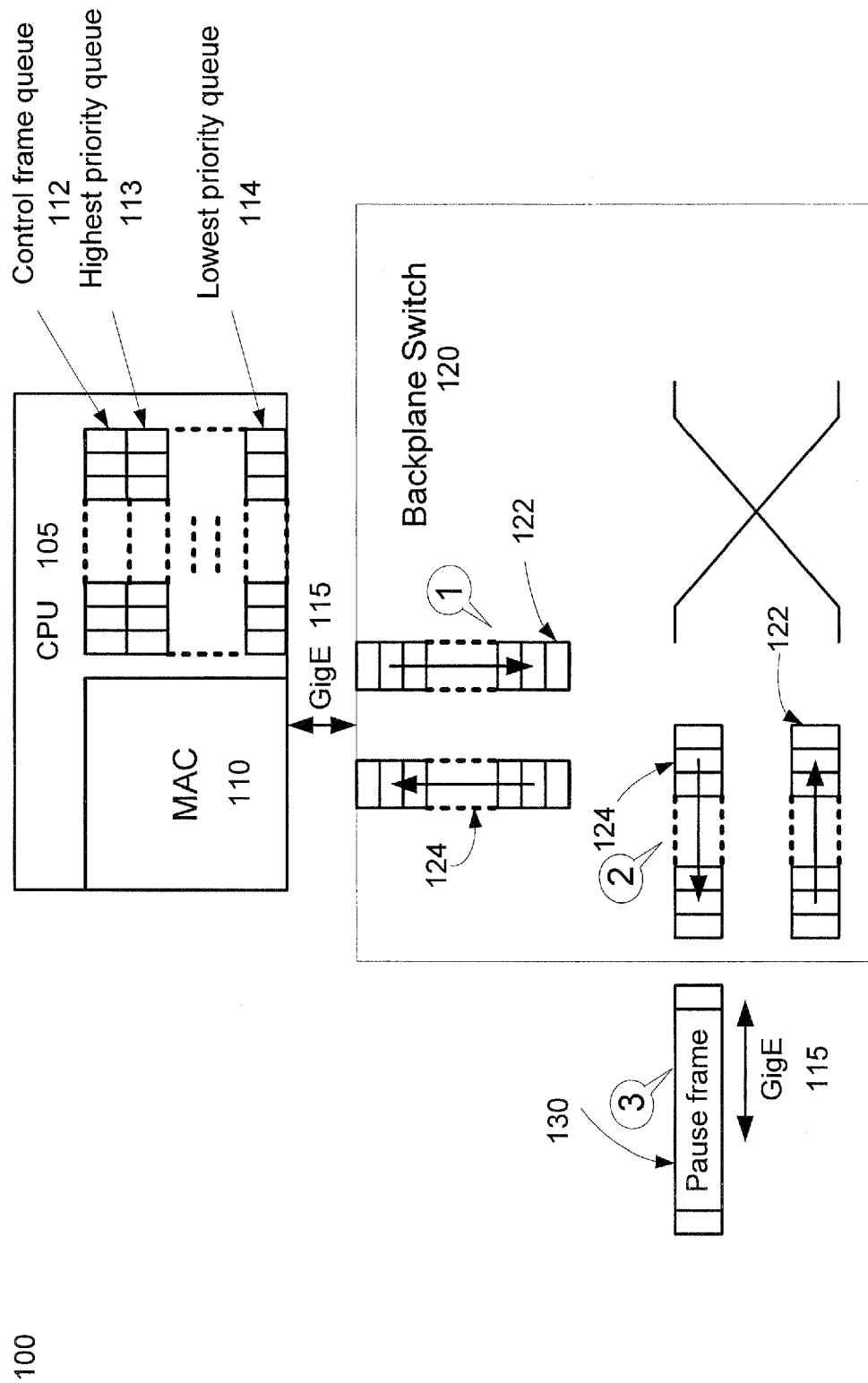
FIG. 1 is a block diagram illustrating the connectivity between a backplane switch and a CPU of an example router, the diagram helpful in illustrating a method of backplane flow control according to the related art.

A method includes detecting packet congestion in a network device that includes a switch, and a plurality of components. The plurality of components is operable to transmit and receive data packets from and to the switch. The method includes, in response to detecting packet congestion, transmitting an Ethernet pause frame to at least one of the plurality of components, the at least one component identified as a source of a packet that caused the packet congestion, transmitting a backward congestion notification (BCN) packet to the component, the BCN packet including some data payload of the packet that caused the packet congestion, and regulating an offending packet stream originating from the at least one component relative to a non-offending packet stream originating from the at least one component in order to lower traffic load of the offending packet stream relative to the non-offending packet stream, the packet that caused the packet congestion belonging to the offending packet stream.

Logic is encoded in one or more tangible media for execution and when executed is operable to detect packet congestion in a router having a backplane switch, a plurality of central processing units (CPUs) operable to transmit and receive packets from and to the backplane switch. The logic, when executed, is further operable to transmit an Ethernet pause frame to at least one of the plurality of CPUs in response to detecting packet congestion, the at least one CPU identified as a source of a packet that caused the packet congestion. The logic, when executed, is further operable to transmit a backward congestion notification (BCN) packet to the at least one CPU, the BCN packet including some data payload of the packet that caused the packet congestion. The logic, when executed, is further operable to, in response to transmitting the BCN packet to the first CPU, regulate an offending packet stream originating from the at least one CPU relative to a non-offending packet stream originating from the at least one CPU in order to lower traffic load of the offending packet stream relative to the non-offending packet stream, the packet that caused the packet congestion belonging to the offending packet stream.

An apparatus includes a first central processing unit (CPU). The first CPU is operable to transmit first packets and second packets and is further operable to transmit the first packets at a reduced rate relative to the second packets in response to receiving a backward congestion notification (BCN) packet and an Ethernet pause frame. The apparatus further includes a second CPU. The second CPU is operable to receive the first packets and the second packets and is further operable to generate the BCN packet when a first one of the first packets causes packet congestion in the second CPU. The apparatus further includes a backplane switch that includes a first port for receiving the first packets and the second packets from the first CPU and a second port for transmitting the first packets and the second packets to the second CPU. The backplane switch is operable to generate the BCN packet when a second one of the first packets causes packet congestion in the backplane switch and is further operable to generate the Ethernet pause frame in response to receiving the BCN packet from the second CPU or to generate the Ethernet pause frame when the second one of the second packets causes packet congestion in the backplane switch.

A system includes means for transmitting first packets belonging to an offending packet stream and second packets belonging to a non-offending packet stream, means for receiving the first packets and the second packets, the second means including an ingress queue that is operable to order incoming first and second packets for subsequent processing by the second means. The system further includes means for switching the first packets and the second packets from the transmitting means to the receiving means, the switching means including an egress queue for ordering outgoing first and second packets from the switching means. The system further includes memory comprising one or more instructions executable by a processor and that when executed is operable to detect when a packet belonging to the offending packet stream triggers a packet congestion situation in the ingress queue or the egress queue, to command the transmission of an Ethernet pause frame to the transmitting means in response to detecting the packet congestion situation, and to command the transmission of a backward congestion notification (BCN) frame to the transmitting means after transmitting the Ethernet pause frame. The transmitting means is operable to reduce the traffic flow of the offending packet stream relative to the non-offending packet stream in response to receiving the BCN frame.

2. Example Embodiments

FIG. 1 is a block diagram illustrating the connectivity between a backplane switch 120 and a CPU 105 of an example router 100, the diagram helpful in illustrating a method of backplane flow control according to the related art.

In particular, FIG. 1 is helpful in illustrating a method of link-to-link backplane flow control using pause frames in accordance with IEEE 802.3-2005, CSMA/CD (Ethernet), hereafter referred to as IEEE 802.3. IEEE 802.3 is incorporated by reference in its entirety.

The router 100 includes a central processing unit CPU 105 and a backplane switch 120.

The CPU 105 includes a media access controller (MAC) 110 that is communicatively connected to the backplane switch 120 by the Gigabit-Ethernet (GigE) link 115. There may be other MACs (not shown) that are communicatively connected to the backplane switch 120 by other GigE links 115 (not shown). The MAC 110 is responsible for transmitting packets to the backplane switch 120 and receiving packets from the backplane switch 120 over the GigE link 115.

The CPU 105 additionally includes a number of queues 112, 113, 114. The queues include a control frame queue 112, a highest priority queue 113, and a lowest priority queue 114. Each of the queues 112, 113, 114 is generally loaded with up to n packets that are waiting to be processed by the CPU 105.

The backplane switch 120 may be communicatively connected to at least one more device (not shown) by another GigE link 115. Every port of the backplane switch 120 has an ingress buffer 122 and an egress buffer 124 associated with the port. From the perspective of the backplane switch 120, the ingress buffers 122 are used to temporarily hold incoming packets from a corresponding GigE link 115, while the egress buffers 124 are used to temporarily hold outgoing packets to be transmitted over the corresponding GigE link 115.

A congestion situation arises in the system 100 when a quota for an ingress buffer 122 exceeds a set threshold. In this case, a pause frame 130 will be sent toward the MAC that connected to the port with the ingress buffer 122, which will cause all packet traffic originating from the MAC to be halted. For further details of this implementation of the pause frame, IEEE 802.3 should be consulted.

As was described above, the pause frame 130 may stop all packet traffic from a MAC, but this can be a significant disadvantage in a multiple session, multi-processor environment. Embodiments of the invention address this and other disadvantages of the related art.

Figure 2:
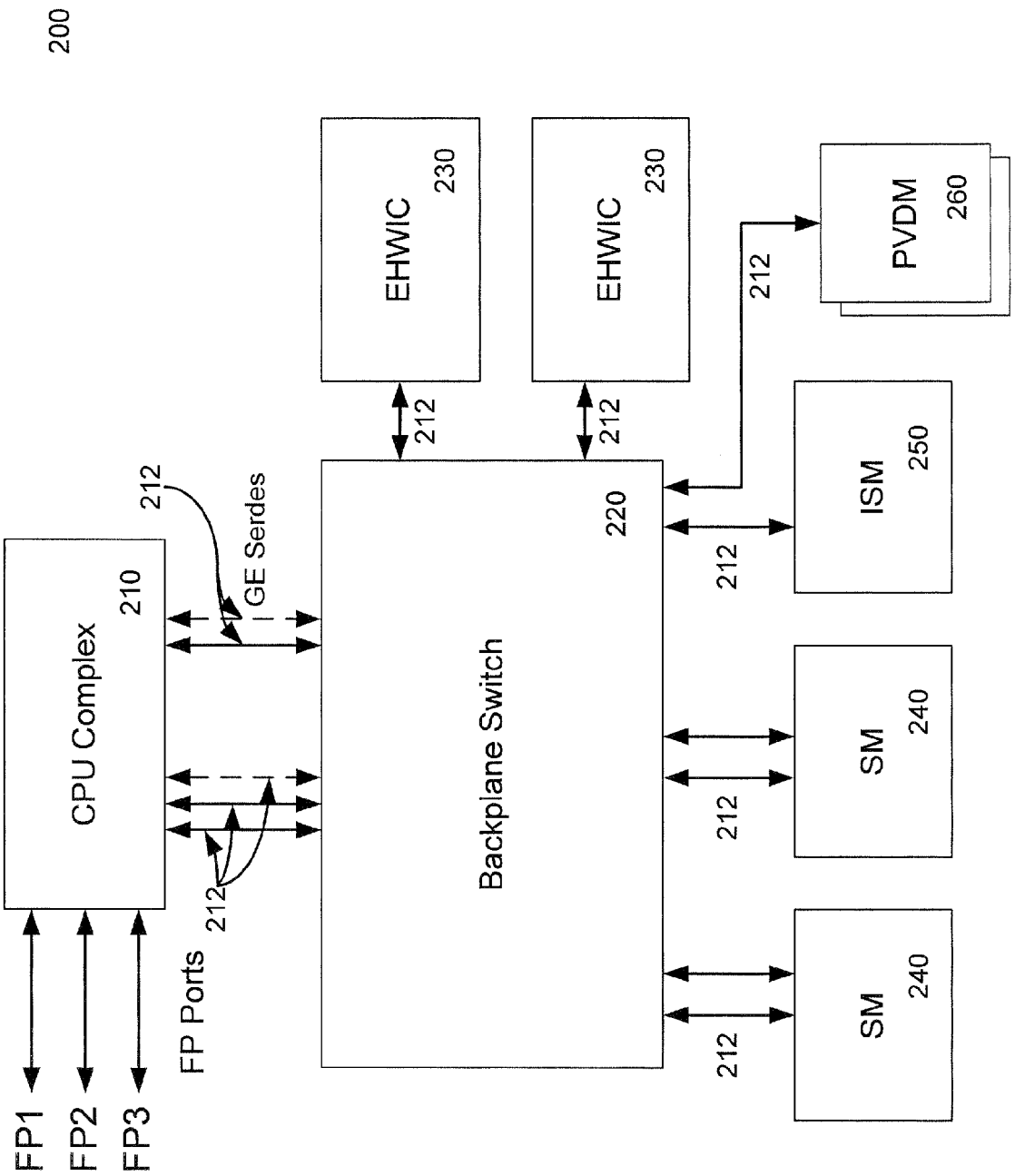
FIG. 2 is a block diagram illustrating the connectivity between a backplane switch and several other components of an example router that is suitable for use with embodiments of the invention.

FIG. 2 is a block diagram illustrating the connectivity between a backplane switch 220 and several other components of an example router 200 that is suitable for use with embodiments of the invention.

Referring to FIG. 2, the router 200 includes a backplane switch 220 that is communicatively connected to a CPU 210 and a number of various modules such as Enhanced Highspeed Wide Area Network (WAN) Interface Cards (EHWICs) 230, Service Modules (SM) 240, an Internal Service Module (ISM) 250, and a Packet Voice/Data Module (PVDM) 260. Embodiments of the invention are also suitable for use with routers having more or less modules 230, 240, 250, and 260 than those depicted in FIG. 2, as the number and type of modules connected to the backplane switch may vary from router to router. Additionally, there are at least three ports from the CPU 210 that are exposed as external front panel (FP) ports FP1, FP2, FP3.

While the backplane switch 220 is used to connect different physical modules 230, 240, 250, 260 as shown in FIG. 2, the backplane switch 220 may also be used to connect to another backplane switch (not shown) using link aggregation or IEEE 802.1ad. An advantage of including two or more backplane switches 220 in a router is to increase the port density. Thus, embodiments of the invention are also suitable for use with routers having two or more backplane switches 220 that are connected in the manner described above.

As illustrated in FIG. 2, the communication links between the backplane switch 220, the CPU 210, and the modules 230, 240, 250, 260 include GigE SERializer/DESerializer (SERDES) links 212 that are represented as solid double-headed arrows or dashed double-headed arrows. The dashed GigE links 212 indicate that the link is optional. A link consisting of two GigE links 212 indicates that the link is twice as wide as a link consisting of only one GigE link 212.

Figure 3:
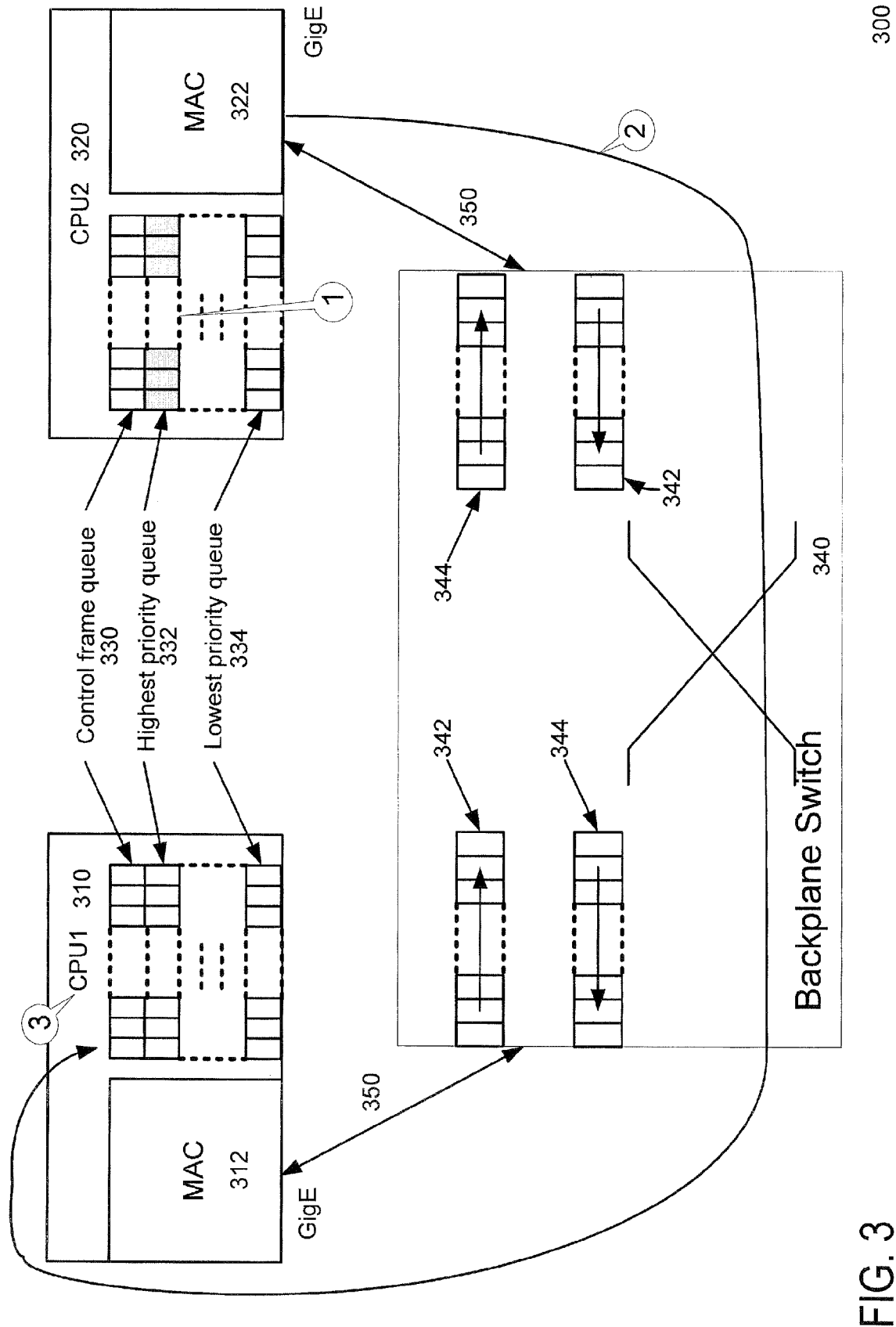
FIG. 3 is a block diagram illustrating some components of an example router according to some embodiments of the invention, and helpful in illustrating a method of flow based throttling in accordance with some embodiments of the invention.

FIG. 3 is a block diagram illustrating some components of an example router 300 according to some embodiments of the invention, and helpful in illustrating a method of flow based throttling in accordance with some embodiments of the invention.

Referring to FIG. 3, the router 300 includes two processors, CPU 310 and CPU 320, as well as a backplane switch 340. Each of the CPUs 310, 320 include a MAC 312, 322, respectively. The MACs 312, 322 may be communicatively connected to a port on the backplane switch 340 by a corresponding GigE link 350. The MACs 312, 322 are responsible for transmitting packets to the backplane switch 340 and receiving packets from the backplane switch over the corresponding GigE link 350.

The CPUs 310, 320 additionally include a number of queues 330, 332, 334. The queues include a control frame queue 330, a highest priority queue 332, and a lowest priority queue 334. Each of the queues 330, 332, 334 is generally loaded with up to n packets that are waiting to be processed by the corresponding CPU 310 or CPU 320.

The backplane switch 340 includes ingress buffers 342 and egress buffers 344. Every switch port of the backplane switch 340 includes an ingress buffer 342 and an egress buffer 344. The ingress buffers 342 receive packets through the corresponding GigE link 350 and the egress buffers 344 are used for transmitting outgoing packets over the corresponding GigE link 350.

According to some embodiments of the invention, a backward congestion notification (BCN) frame may be generated in router 300 in two situations.

The first situation occurs when a quota for one of the egress buffers 344 in the backplane switch 340 exceeds a set threshold for a high water mark, the high water mark indicative of how many packets must be present in the egress buffer for the egress buffer to be considered congested. In response to the detection of a congestion scenario in one of the egress buffers 344, the backplane switch 340 sends a BCN frame toward the port of the backplane switch that received the congestion triggering packet. The BCN frame control field of the BCN frame contains the information of the congestion source port from the offending packet. The corresponding MAC 312, 322 that is connected to the congested source port can then implement throttling to regulate the traffic to the congested source port.

The second situation arises when one of the MACs 312, 322 that is communicatively connected to a port of the backplane switch 340 detects that one of its input buffer queues 330, 332, 334 has exceeded the set threshold for a high water mark for that queue. In this situation, the corresponding MAC 312, 322 sends a BCN frame towards the backplane switch 340, the BCN frame control field containing the information of the congestion source port from the offending packet. An example of this second situation is explained in further detail in the following paragraphs, where particular attention is given to the three numerical references 1, 2, 3 illustrated in FIG. 3.

Referring to numerical reference 1, when an input queue high water mark is detected in CPU 320, CPU 320 sends a BCN packet to the backplane switch 340. The source address of the packet that triggered the high water mark is used as the destination address in the BCN packet. Additionally, some of the data payload of the packet that triggered the high water mark is returned in the BCN packet. Preferably, the first 26 bytes of the payload are returned. In alternative embodiments of the invention, more than the first 26 bytes of the payload are returned.

Referring to numerical reference 2, the backplane switch 340 forwards the BCN packet towards the source of the packet that triggered the high water mark, in this case CPU 310.

Referring to numerical reference 3, CPU 310 inspects the BCN packet and, based upon the congestion source information contained in the returned first 26 bytes or the payload, regulates the offending stream from the congestion source. This will lower the traffic load from CPU 310 to CPU 320 for that particular stream only. Other streams, if any, can still be forwarded to CPU 320 by the MAC 312. Of course, multiple packet streams from different congestion sources may be simultaneously regulated.

In the manner described above, flow-based or stream-based throttling is accomplished by some embodiments of the invention. For purposes of this disclosure, the term flow-based throttling or stream-based throttling refers to the ability to regulate the flow of a particular stream relative to other streams that are also being routed through the backplane switch.

According to the above and other embodiments of the invention, congestion control is pushed from the core of the network to the edges, where the loading is lighter and more resources are typically available to rate limit the congestion. BCN is designed for short control loop, at layer 2, and can support non-IP protocol. The advantage of these and other embodiments of the invention is the ability to provide flow-based congestion source information, allowing packet overflow to be regulated by limiting or informing the source of the packet stream that is causing the congestion condition.

Since the embodiments of the invention described above are a software driven flow control mechanism, it takes a CPU a certain amount of time to respond to its input buffer from interrupt, inspect the BCN frame, and begin to regulate the flow. This is known as CPU services latency. During this latency period, the CPU MAC, a separate component in the system, continues to send packets to the backplane switch until the CPU intervenes. This requires the backplane switch to be equipped with a larger buffer to guarantee lossless during this CPU latency period until the CPU intervenes.

Figure 4:
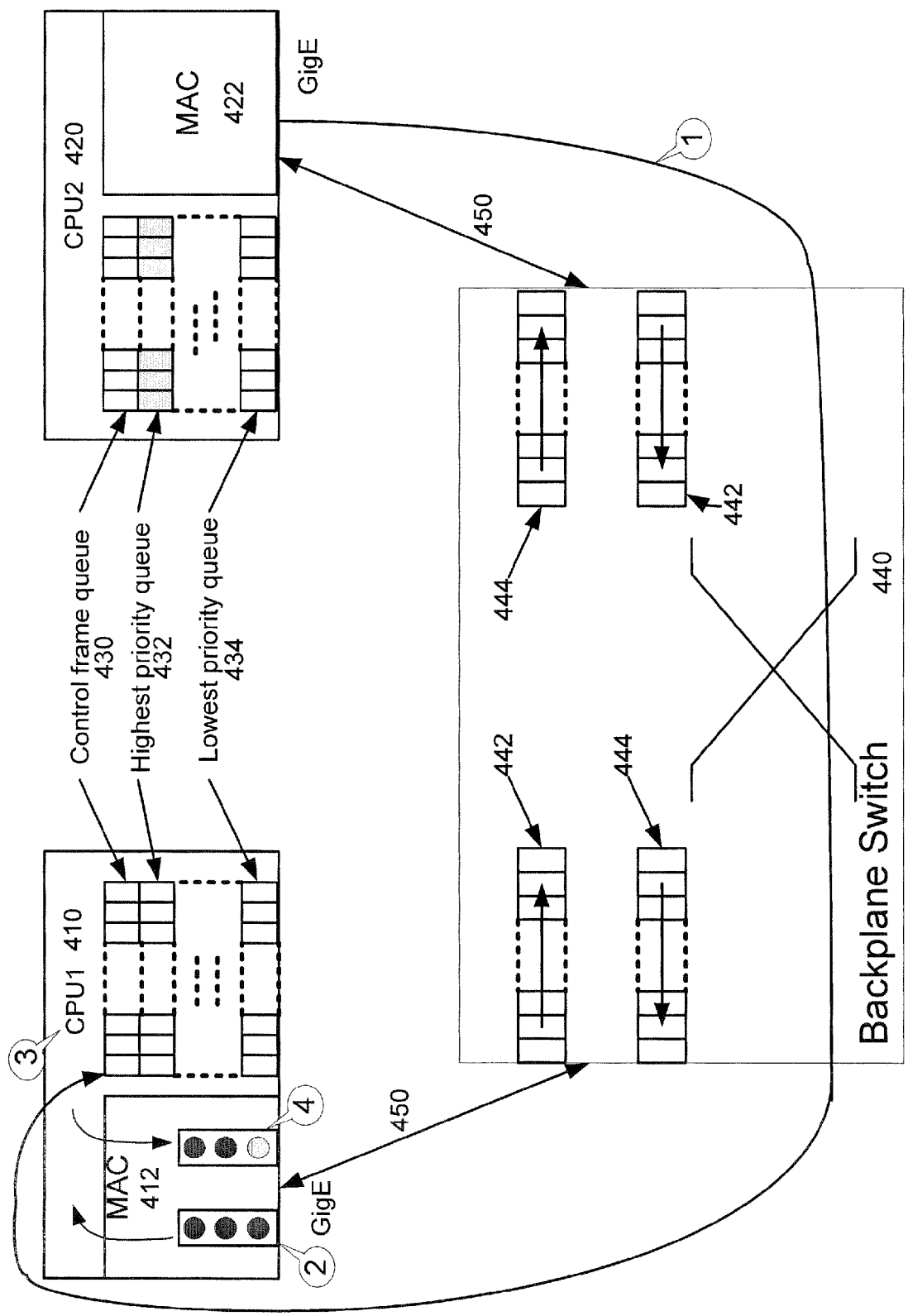
FIG. 4 is a block diagram illustrating some components of an example router according to some embodiments of the invention, and helpful in illustrating a method of flow based throttling in accordance with some embodiments of the invention.

FIG. 4 is a block diagram illustrating some components of an example router 400 according to some embodiments of the invention, and helpful in illustrating a method of flow based throttling in accordance with some embodiments of the invention. According to these embodiments, the CPU services latency issue described in the preceding paragraph is addressed.

Referring to FIG. 4, the router 400 includes two processors, CPU 410 and CPU 420, as well as a backplane switch 440. CPU 410 includes a MAC 412, while CPU 420 includes a MAC 422. The MACs 412, 422 are communicatively connected to a port on the backplane switch 440 by a corresponding GigE link 450. The MACs 412, 422 are responsible for transmitting packets to the backplane switch 440 and receiving packets from the backplane switch over the corresponding GigE link 450.

The CPUs 410, 420 additionally include a number of queues 430, 432, 434. The queues include a control frame queue 430, a highest priority queue 432, and a lowest priority queue 434. Each of the queues 430, 432, 434 may generally be loaded with up to n packets that are waiting to be processed by the corresponding CPU 410 or CPU 420.

The backplane switch 440 includes ingress buffers 442 and egress buffers 444. Every switch port of the backplane switch 440 includes an ingress buffer 442 and an egress buffer 444. The ingress buffers 442 receive packets through the corresponding GigE link 450 and the egress buffers 444 are used to order the outgoing packets to be transmitted over the corresponding GigE link 450.

In the following paragraphs, a method of flow-based flow control is described according to some other embodiments of the invention. The embodiments of the invention described below advantageously combine elements of the embodiments that were described above with elements of the pause frame congestion solution of IEEE 802.3 that was described above. To illustrate the method, an example scenario is described with particular attention paid to the numerical references 1, 2, 3, and 4 that are found in FIG. 4.

Similar to the embodiments that were described above, when an input queue high water mark is detected in CPU 420, CPU 420 sends a BCN packet to the backplane switch 440. The source address of the packet that triggered the high water mark is used as the destination address in the BCN packet. Additionally, some of the data payload of the packet that triggered the high water mark is returned in the BCN packet. Preferably, the first 26 bytes of the payload are returned, but other embodiments of the invention may return more than the first 26 bytes of the payload.

The backplane switch 440 expedites the BCN packet as highest priority toward the offending packet source, in this case CPU 410. Prior to sending the BCN packet to CPU 410, the backplane switch 440 generates a pause frame toward CPU 410. MAC 412 detects the pause frame and saves it in its control frame input buffer 430 for later inspection, and generates an interrupt for CPU 410. The pause frame is sent to CPU 410 in order to shut off all transmissions from MAC 412 and minimize latency in the flow path.

As was explained above, the CPU service latency issue arises because there are still packets destined for CPU 420, which temporarily reside in the transmitter of MAC 412 and the buffer pool inside the backplane switch 440. The longer it takes for CPU 410 to acknowledge the pause frame packet, the bigger the buffer that is required inside the backplane switch 440 to ensure that no packets are lost.

Following the pause frame, MAC 412 also saves the BCN packet from CPU 420 to the control frame input buffer 430. The path of the BCN packet from the CPU 420 to the CPU 410 through the backplane switch 440 is indicated by numerical reference 1.

Upon the interrupt from MAC 412, which is indicated by numerical reference 2, CPU 410 inspects the pause frame packet and the BCN packet, and based upon the returned first 26 bytes of the payload regulates the offending stream, which is indicated by numerical reference 3. This will lower the traffic load from CPU 410 to CPU 420 for that particular stream only. Other streams, if any, can still be forwarded to CPU 420. This accomplishes stream-based or flow-based throttling.

As indicated by numerical reference 4, the MAC 412 is then re-enabled to continue transmitting packets, where the packets include those from unregulated streams, packets from the regulated stream, and possibly packets from other regulated streams as well. Many different methods of regulating a particular flow or stream are possible, for example, the regulated stream may exponentially slow down the traffic flow then gradually increase the traffic flow back to normal.

According to some other embodiments of the invention, a quota for one of the egress buffers 444 in the backplane switch 440 may exceed a set threshold for a high water mark, where the high water mark is indicative of how many packets must be present in the egress buffer for the egress buffer to be considered congested.

In response to the detection of a congestion scenario in one of the egress buffers 444, the backplane switch 440 generates and sends a pause frame toward the port of the backplane switch that received the congestion triggering packet, which is received by the corresponding MAC, for example, MAC 412, which is connected to the congested source port. The pause frame temporarily disables transmission of all packets from the corresponding MAC 412, 422, as was described above.

MAC 412 detects the pause frame and saves it in its control frame input buffer 430 for later inspection, and generates an interrupt for CPU 410. The pause frame is sent to CPU 410 in order to shut off all transmissions from MAC 412 and minimize latency in the flow path.

As was explained above, the CPU service latency issue arises because there are still packets destined for CPU 420, which temporarily reside in the transmitter of MAC 412 and the buffer pool inside the backplane switch 440. The longer it takes for CPU 410 to acknowledge the pause frame packet, the bigger the buffer that is required inside the backplane switch 440 to ensure that no packets are lost.

After the pause frame is generated, the backplane switch 440 then generates and sends a BCN frame toward the port of the backplane switch that received the congestion triggering packet. The backplane switch 440 expedites the BCN packet as highest priority toward the offending packet source, in this case CPU 410. Following the receipt of the pause frame, MAC 412 also saves the BCN packet to the control frame input buffer 430.

Upon the interrupt from MAC 412, CPU 410 inspects the pause frame packet and the BCN packet contained in the control frame input buffer 430, and based upon at least the returned first 26 bytes of the payload regulates the offending stream. This will lower the traffic load from CPU 410 to the backplane switch 440 for that particular stream only. Other streams, if any, can still be forwarded to the backplane switch 440. This accomplishes stream-based or flow-based throttling.

After flow-based throttling is implemented, the MAC 412 is then re-enabled to continue transmitting packets, where the packets include those from unregulated streams, packets from the regulated stream, and possibly packets from other regulated streams as well. Many different methods of regulating a particular flow or stream are possible, for example, the regulated stream may exponentially slow down the traffic flow then gradually increase the traffic flow back to normal.

Figure 5:
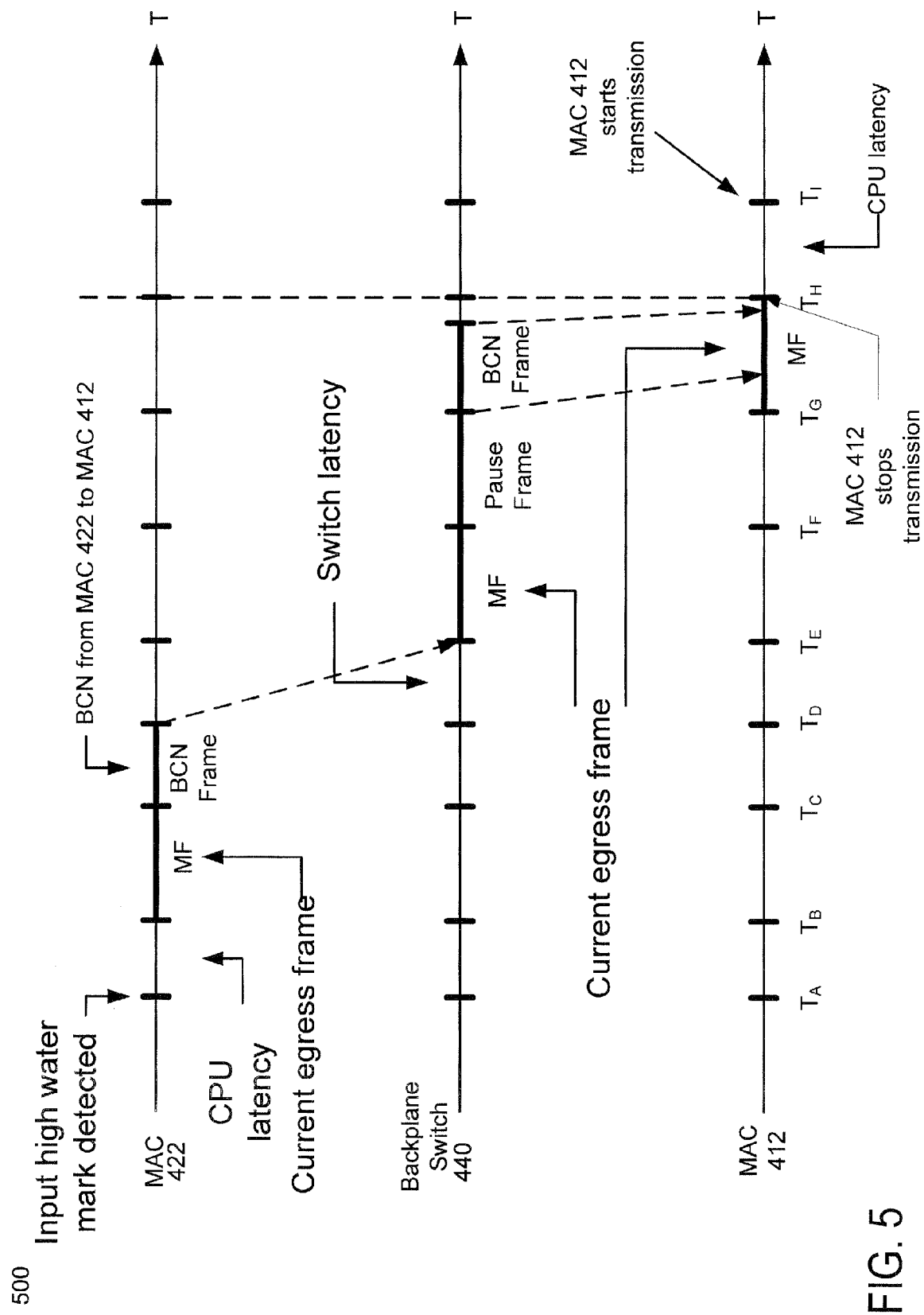
FIG. 5 is a timing diagram that further illustrates the method shown in FIG. 4.

FIG. 5 is a timing diagram that further illustrates the method shown in FIG. 4. In particular, FIG. 5 illustrates the timing of some of the embodiments that were described above with reference to FIG. 4.

Referring to FIG. 5, a timeline is shown for MAC 412, MAC 422, and backplane switch 440.

Referring to the timeline for MAC 422, the CPU 420 detects a high water mark for one of its input queues at time Ta, and in response MAC 422 sends a BCN frame to the backplane switch 440 between time Tc and Td. Prior to that time, there is a time period that is associated with the CPU latency (between time Ta and Tb), as well as a time period associated with processing the current egress frame MF (between time Tb and Tc). The source address of the packet that triggered the high water mark is used as the destination address in the BCN frame. Additionally, at least the first 26 bytes of the data payload of the packet that triggered the high water mark is contained in the BCN frame.

Referring to the timeline for the backplane switch 440, after a switch latency period (Td to Te), the backplane switch 440 receives the BCN frame and expedites the BCN frame as highest priority toward the offending packet source, in this case CPU 410. Before the BCN frame is sent to CPU 410, however, the backplane switch generates and sends a pause frame toward CPU 410 (between times Tf and Tg). Then, between times Tg and Th, the BCN frame is sent towards CPU 410. Between times Te and Tf there is a period associated with the processing of the current egress frame MF.

Referring to the timeline for the MAC 412, during a time period between Tg and Th when the current egress frame MF is being processed, MAC 412 first receives the pause frame followed a short time later by the BCN frame. Upon detection of the pause frame MAC 412 saves it in the control frame queue 430 of CPU 410 for later inspection, and generates an interrupt for CPU 410. MAC 412 also saves the BCN frame to the control frame input buffer 430 of CPU 410.

After the current frame MF is processed, the MAC 412 ceases transmission at time Th in response to the pause frame from the backplane switch 440. Upon the interrupt at time Th, CPU 410 inspects the pause frame packet and the BCN packet, and based upon at least the returned first 26 bytes of the payload regulates the stream of packets causing the congestion. The regulation lowers the traffic load from CPU 410 to CPU 420 for that particular stream only. Other streams, if any, can still be forwarded to CPU 420. This accomplishes stream-based or flow-based throttling.

Momentarily preventing the transmission of packets from MAC 412 during a latency period for CPU 410 (between Th and Ti) by using a pause frame minimizes latency in the flow path and eliminates the need for a larger buffer in the backplane switch to cover the CPU services latency. Because a larger buffer is not required in the backplane switch to cover the CPU services latency, the embodiments described with reference to FIGS. 4 and 5 improve upon the embodiments described with reference to FIG. 3 by achieving a lower cost flow-based flow control solution.

At time Ti, the MAC 412 is then re-enabled to continue transmitting packets, where the packets include those from unregulated streams, packets from the regulated stream, and possibly packets from other regulated streams as well.

Many different methods of throttling or regulating a particular flow or stream are possible, for example, the regulated stream may exponentially slow down the traffic flow then gradually increase the traffic flow back to normal. However, the particular method used to throttle or regulate the traffic flow is not critical for the implementation of embodiments of the invention.

Figure 6:
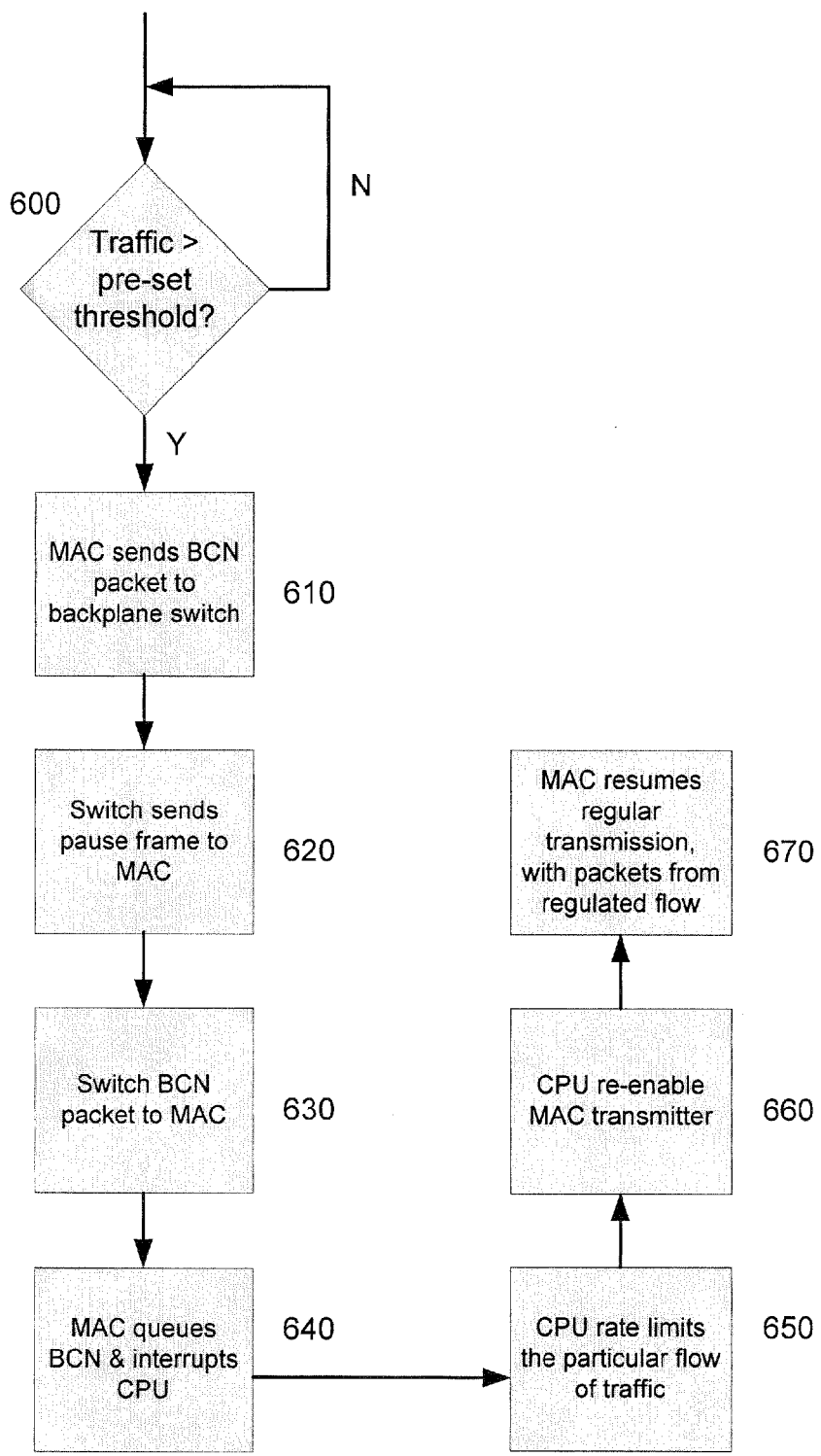
FIG. 6 is a flow diagram illustrating example processes included in a method of implementing backplane flow-based flow control according to some embodiments of the invention.

FIG. 6 is a flow diagram illustrating example processes included in a method of implementing backplane flow-based flow control according to some embodiments of the invention.

Process 600 refers to a MAC checking or being alerted to the condition that input traffic loading has exceeded a pre-configured level or high watermark.

In response to the input traffic exceeding the pre-configured level, the MAC sends a BCN packet toward the backplane switch, as indicated in process 610. The BCN packet allows at least the first 26 bytes of information from the original packet causing the congestion to be carried in the BCN packet back to the original sender.

Upon receiving the BCN frame, the backplane snitch generates and sends an Ethernet pause frame from the destination port egress, the pause frame being sent to the MAC connected to the destination port egress and responsible for sending the original packet, as indicated in process 620. In response to the pause frame, the MAC transmitter is temporarily disabled and prevented from transmitting any packet traffic.

After the pause frame is sent, the backplane switch switches the BCN frame toward the MAC that is responsible for sending the original packet through the same destination port egress, as indicated in process 630.

As illustrated in process 640, the MAC, which can still receive packets, receives and queues up the BCN frame into a separate control input queue and generates an interrupt for the CPU. The interrupt alerts the CPU to process the BCN frame. Since the MAC transmitter has been temporarily disabled during this time, no additional packets from the MAC are being sent to the backplane switch and the CPU service latency is minimized.

As illustrated in process 650, the CPU rate limits a particular flow of traffic based upon the information contained in the BCN packet. That is, packets from a particular source may be throttled by the CPU, slowing down the packet rate from this particular source.

After the particular flow has been throttled, the CPU can then re-enable the MAC transmitter to resume regular transmission of packets from the port, as indicated in processes 660 and 670. The packets transmitted from the port may now include packets from unregulated flows or streams, packets from the regulated flow or stream, and possibly packets from other regulated flows as well.

In the manner described above, stream-based or flow-based throttling may be accomplished by embodiments of the invention. Furthermore, because the MAC transmitter is temporarily disabled during the CPU service latency period, the backplane switch does not require a large buffer to ensure a lossless condition during the CPU service latency period, and these embodiments of the invention therefore achieve a low-cost method of implementing flow-based or stream-based flow control.

The invention claimed is:

1. A method comprising:
    detecting packet congestion in a network device that includes a switch and a plurality of components, the plurality of the components being configured to transmit packets to the switch;
    in response to detecting packet congestion, transmitting an Ethernet pause frame to at least one of the plurality of components the at least one component being identified as a source of a packet that caused the packet congestion;
    transmitting a backward congestion notification (BCN) packet to the at least one component, the BCN packet including data payload of the packet that caused the packet congestion;
    expediting the BCN packet transmission to the source of the packet that caused the packet congestion as a highest priority;
    identifying an offending stream responsive to at least a portion of the data payload; and
    throttling an offending packet stream originating from the at least one component responsive to the at least a portion of the data payload and relative to a non-offending packet stream originating from the at least one component in order to lower traffic load of the offending packet stream relative to the non-offending packet stream, the packet that caused the packet congestion belonging to the offending packet stream,
    wherein the non-offending packet is not throttled responsive to the BCN packet.

2. The method of claim 1, where the network device comprises a router, the plurality of components comprises a plurality of central processing units (CPUs), and the switch comprises a backplane switch.

3. The method of claim 2, where detecting packet congestion in the router comprises detecting packet congestion in an egress queue of the backplane switch.

4. The method of claim 3, where transmitting the BCN packet to the at least one CPU comprises generating the BCN packet with the backplane switch.

5. The method of claim 2, where detecting packet congestion in the router comprises detecting packet congestion in an ingress queue of another one of the plurality of CPUs.

6. The method of claim 5, where transmitting the BCN packet to the at least one CPU comprises:
    generating the BCN packet with the another CPU; and
    transmitting the BCN packet from the another CPU to the backplane switch.

7. Logic encoded in one or more computer readable storage media for execution by one or more processors and when executed configured to cause a computer to:
    detect packet congestion in a router having a backplane switch and a plurality of central processing units (CPU), the plurality of the CPUs being configured to transmit and receive data packets to and from the backplane switch;
    in response to detecting packet congestion, transmit an Ethernet pause frame to at least one CPU, the at least one CPU being identified as a source of a packet that caused the packet congestion;
    transmit a backward congestion notification (BCN) packet to the at least one CPU, the BCN packet including some data payload of the packet that caused the packet congestion and an indication that the BCN packet is a highest priority packet; and
    in response to transmitting the BCN packet to the at least one CPU, regulate an offending packet stream responsive to at least a portion of the data payload, the offending packet stream originating from the at least one CPU relative to a non-offending packet stream originating from the at least one CPU in order to lower a traffic load of the offending packet stream relative to the non-offending packet stream, where the packet that caused the packet congestion belongs to the offending packet stream, wherein the non-offending packet is not regulated responsive to the BCN packet.

8. The logic of claim 7, where the detection of packet congestion in the router comprises detecting packet congestion in an egress queue of the backplane switch.

9. The logic of claim 8, where the transmission of the BCN packet to the at least one CPU comprises generating the BCN packet with the backplane switch.

10. The logic of claim 7, where the detection of packet congestion in the router comprises detecting packet congestion in an ingress queue of another of the plurality of CPUs, the another CPU being configured to receive the offending packet stream and the non-offending packet stream from the backplane switch.

11. The logic of claim 10, where the transmission of the BCN packet to the at least one CPU comprises:
generating the BCN packet with the another CPU; and
transmitting the BCN packet from the another CPU to the backplane switch.

12. An apparatus comprising:
a first central processing unit (CPU), the first CPU configured to transmit first packets and second packets, the first CPU further configured to transmit the first packets at a reduced rate relative to the second packets in response to receiving a backward congestion notification (BCN) packet and an Ethernet pause frame;
a second CPU, the second CPU configured to receive the first packets and the second packets, the second CPU further configured to generate the BCN packet when a first one of the first packets causes packet congestion in the second CPU, wherein the BCN includes an indication that it is a highest priority packet and a portion of a data payload from the first one of the first packets; and
a backplane switch that includes a first port for receiving the first packets and the second packets from the first CPU and a second port for transmitting the first packets and the second packets to the second CPU, the backplane switch configured to generate the BCN packet when a second one of the first packets causes packet congestion in the backplane switch, the backplane switch further configured to generate the Ethernet pause frame in response to receiving the BCN packet from the second CPU or to generate the Ethernet pause frame when the second one of the second packets causes packet congestion in the backplane switch;
wherein the first CPU is configured to begin transmitting the first packets at the reduced rate relative to the second packets responsive to at least a portion of the portion of the data payload of the BCN packet and wherein the transmission rate of the second packets is not reduced responsive to the BCN packet.

13. The apparatus of claim 12, where the first CPU is configured to halt transmission of the first packets and the second packets upon receiving the Ethernet pause frame.

14. The apparatus of claim 12, where the BCN packet contains some of the data payload of the first one of the first packets or of the second one of the first packets.

15. A system comprising:
means for transmitting first packets belonging to an offending packet stream and second packets belonging to a non-offending packet stream;
means for receiving the first packets and the second packets;
means including an ingress queue that is configured to order incoming first and second packets for subsequent processing by the means including an ingress queue;
a means for switching the first packets and the second packets from the transmitting means to the receiving means, the switching means including an egress queue for ordering outgoing first and second packets from the switching means;
and
memory comprising one or more instructions executable by a processor and that when the instructions are executed is configured to:
detect when a packet belonging to the offending packet stream triggers a packet congestion situation in the ingress queue or the egress queue;
command a transmission of an Ethernet pause frame to the transmitting means in response to detecting the packet congestion situation;
command a transmission of a backward congestion notification (BCN) frame to the transmitting means after transmitting the Ethernet pause frame, wherein the BCN includes data payload of the packet, wherein the transmitting means is configured to reduce a traffic flow of the offending packet stream relative to the non-offending packet stream responsive to at least a portion of the data payload received in the BCN frame;
wherein reducing the traffic flow of the offending packet stream is independent of regulating the non-offending stream; and
wherein the BCN includes an indication that it is a highest priority packet for expediting transmission to an offending stream source.

16. The system of claim 15, where the first packets have a common first source address and the second packets have a common second source address.

17. The system of claim 15, where the transmitting means is configured to halt transmission of the first packets and the second packets in response to receiving the Ethernet pause frame.

18. The system of claim 15, where the receiving means is configured to generate the BCN frame and transmit the BCN frame to the switching means when the packet congestion situation is detected in the ingress queue.

19. The system of claim 15, where the switching means is configured to generate the BCN frame when the packet congestion situation is detected in the egress queue.

* * * * *